July 28, 1959    R. J. KRIEGER    2,897,340
FABRICATION OF CONSUMABLE ELECTRODES
Filed Sept. 3, 1957
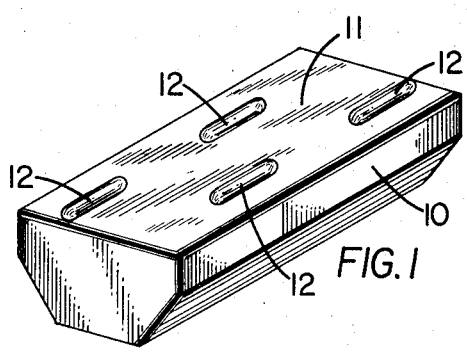
FIG. 1
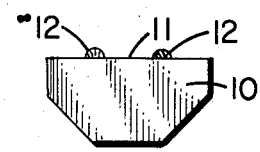
FIG. 2
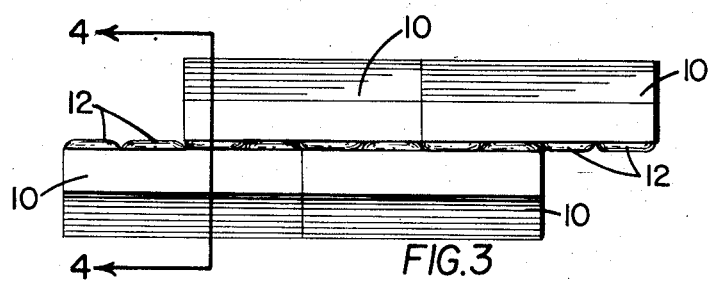
FIG. 3
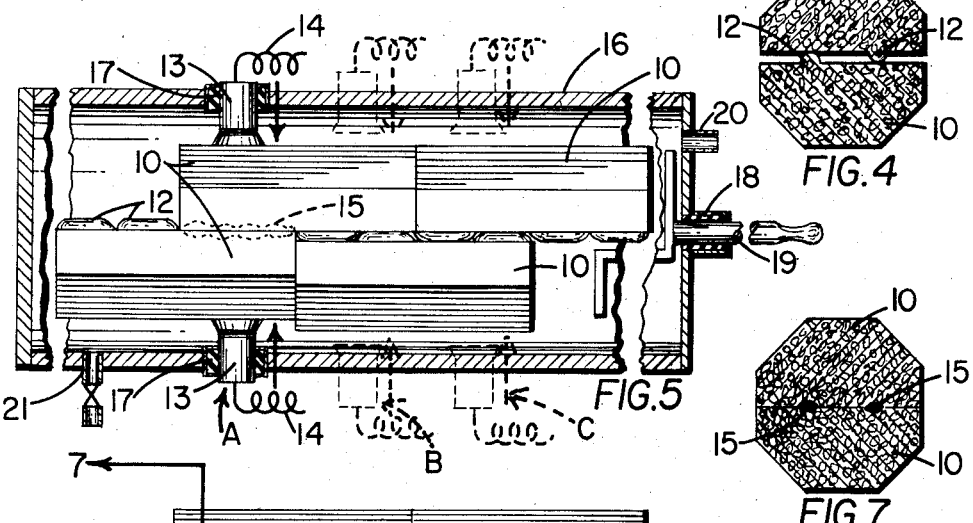
FIG. 4
FIG. 5
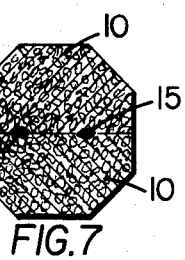
FIG. 7
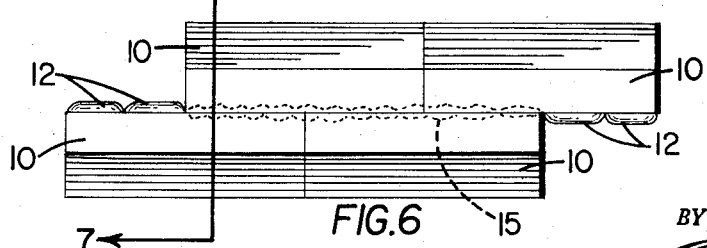
FIG. 6
INVENTOR.
ROBERT J. KRIEGER
BY
AGENT

2,897,340

FABRICATION OF CONSUMABLE ELECTRODES

Robert J. Krieger, Las Vegas, Nev., assignor to Titanium Metals Corporation of America, New York, N.Y., a corporation of Delaware Application September 3, 1957, Serial No. 681,686

4 Claims. (Cl. 219—117)

This invention relates to the fabrication of consumable electrodes which are employed to produce ingots of refractory metals in an arc furnace.

Previously employed methods for fabricating consumable electrodes have not generally proved satisfactory or economical. Refractory metals such as, for example, titanium and zirconium may be originally produced in, or processed into, subdivided form such as particles or granules. These are compressed together into compacts which are fabricated into an integral structure to form a consumable electrode. Heretofore the compacts have generally been welded one to another by arc welding using either a tungsten or a filler metal electrode. Such operations have suffered from the disadvantage that considerable time and tedious work is expended in the welding operation. In addition, contamination from a non-consumable electrode, for example of tungsten, often occurs and is undesirable; and the cost of filler metal wire used for consumable electrode welding is often excessive.

It is a principal object of this invention to provide an improved process for fabricating consumable electrodes to be employed in an arc melting furnace. A further object of this invention is to provide a rapid and economical method of producing consumable electrodes from compacts formed of subdivided metal. These and other objects of this invention will be apparent from the following description thereof and from the annexed drawings in which:

Fig. 1 shows a perspective view of a compact useful in the process of this invention.

Fig. 2 shows an end view of the compact of Fig. 1.

Fig. 3 shows a plurality of compacts assembled in face to face and staggered relationship.

Fig. 4 shows a section of the assembly of Fig. 3 taken along the line 4—4.

Fig. 5 illustrates the manner in which overlaid portions of the compact are pressed together and welded by passage of electric current.

Fig. 6 shows a side view of a fabricated electrode according to this invention.

Fig. 7 shows a section of the electrode of Fig. 6 taken along the line 7—7.

Referring now to Figs. 1 and 2, powdered, granulated, or otherwise subdivided metal is first formed into a compact. The compact is characterized by a form which is a semi-section of the desired configuration in the complete electrode. For example, the compact 10 illustrated in Figs. 1 and 2 is of semi-octagonal cross section with a section face identified for clarity as 11. It will be apparent that two such compacts placed section face to section face will produce an octagonal cross section electrode. It will be understood, for example, that if the completely fabricated electrode is desired to be of circular cross section, then the cross section of the compacts will be semi-circular. As another example, if a hexagonal electrode is desired, then the compact cross section will be semi-hexagonal. Preferably as shown, the compacts are elongated, that is, are generally longer in the dimension perpendicular to the form cross section.

The compacts 10 are further characterized by provision of a land or lands 12 which project from the surface of section face 11. The precise nature and preferred design of these lands will be described hereinafter in more detail.

The compacts 10 may be produced according to known procedures in any type of suitable and conventional apparatus which may be electrically, hydraulically or manually operated. In principle, a die of desired configuration is employed and sufficient subdivided metal is placed in the die and then compressed into the required compact by a piston or plunger. It will be appreciated that the piston and die elements will be of configuration to produce in the finished compact the desired cross section and length of compact as well as forming the required land or lands 12.

After forming the compacts, a plurality of at least two of these are assembled in section face to section face relationship and staggered longitudinally so that a portion, preferably at least one quarter, of one compact overlays a similar portion of a facing compact. It will be appreciated that with less than one half overlay at one end of a compact the adjoining overlay will be correspondingly greater than one half, for example a one third overlay of two compacts will result in two thirds overlay of remaining portions of such compacts on the adjacent compacts. For convenience and uniformity it is preferred that the overlay should be substantially one half of each facing compact as illustrated in Fig. 3. The amount of overlay and the design and location of the lands is arranged so that a land on each compact abuts a land free area on the facing compact. After assembly, the overlaid portions of facing compacts are pressed together by any convenient mechanical or manually operated means in the manner illustrated generally in Fig. 5. As shown, the overlaid portions of compacts 10 are pressed together by inward force exerted by plungers 13 actuated by conventional and convenient mechanism not shown. Electric current connections 14 are made to each of the plungers 13 and sufficient electric current is passed through the overlaid portions of the compacts 10 during the pressing to form the interposed lands 12 into weldments and thereby to weld the compacts into an integral consumable electrode structure. It will be apparent that when the overlaid portions of compacts 10 have been so welded at position A as shown in Fig. 5, the assembled compacts, or the plungers 13, are moved so that the plungers 13 are aligned with the adjacent overlaid compact portions in the relative position shown in dotted lines at B and the process repeated. After this weld has been made the compacts, or plungers, are again moved to align the next overlaid portions with the plungers as shown in dotted lines at C, and the same process again repeated. By further repetition of the process, an electrode of desired length may be fabricated by assembling and welding the required number of elongated compacts.

The completely fabricated electrode as shown in Fig. 6, now has the required sectional form, with the individual compacts united into an integrated consumable electrode structure by weldments, 15, illustrated in section in Fig. 7, which have been formed from the lands, 12.

When forming electrodes of metals such as titanium and zirconium which react with atmospheric gases, at elevated temperatures, it is preferred to carry out the welding operation in vacuo or under an atmosphere of inert gas. This may be accomplished by placing the assembled compacts as shown in Fig. 3 in an elongated sealed compartment as illustrated at 16 in Fig. 5. The compartment 16 may be provided with suitable sliding seals 17 through which the plungers 13 can operate and also seal 18 through which mechanical arm 19 may be actuated to move and relocate the assembled compacts for each successive weld. The compartment 16 additionally is provided with pipe connection 20 which for evacuation may be connected to a suitable vacuum pump (not shown), or if inert gas atmosphere is employed, to a suitable source of argon or helium. If inert gas is employed an additional valved pipe connection 21 may be provided for flushing purposes.

The size, configuration and location of the land or lands 12 on the section face 11 may vary widely. They are arranged so that when compacts are placed in staggered face to face relationship, as described, a land on one compact will abut a land free area on the facing compact. This may be achieved by locating lands only in one end or one side of each compact face. Care must be taken in assembly of compacts, however, when employing this arrangement, to make sure that they are in proper relative position to place the lands properly abutting a land free area on the facing compact. Preferably lands are located only in diagonally opposite quarters of each half section face as illustrated in Fig. 1. This arrangement insures a land contacting a land free area on a facing compact under any assembly conditions, according to this invention.

It will be obvious that with overlay of other than one half of each compact, a suitable arrangement of lands can be employed to provide the proper distribution of land area and contact as herein before described.

For proper welding effect and reasonable power efficiency, the lands should occupy between 2 and 20% of the area of the section face from which they project. They should be between $1/16$ and $1/4$ inch high, although somewhat higher lands may be advantageously employed with large overall size compacts. Preferably the width of the land should be about four times its height, although considerable variation in this regard will not prove disadvantageous. A series of elongated lands, aligned with the longitudinal axis of the compact, will provide advantageous welding characteristics and result in a strong fabricated structure.

The pressure employed to press the overlaid portions of compacts together during welding may vary between 400 to 2,000 lbs. per square inch of land area in the overlaid section faces. The amount of current supplied will normally vary between 8 and 300 kva. per square inch of land area between faces, applied at a voltage between 4 to 22 volts and for a time which may vary from about one tenth of a second to about 10 seconds. The higher amounts of current will generally be employed when the time of application is shorter and vice versa.

*Example 1*

A number of titanium sponge compacts of configuration illustrated in Fig. 1 were employed. Each compact was 12 inches long and 4 inches wide and 2 inches deep. The lands were each slightly less than 3 inches long, $1/2$ inch wide and $1/8$ inch high. The section face was 4 by 12 inches, having 6 square inches of land area equivalent to $12 1/2 \%$.

Eight compacts were then assembled in section face to section face staggered relationship as illustrated in Fig. 3. Hydraulic powered plungers were then employed to press the overlaid portions of the two end compacts together, using a force of 5,000 lbs. which was equivalent to about 830 lbs. per square inch of land area between the faces. During the pressing, alternating electric current, connected to the plungers, was passed through the overlaid compact portions. The current amounted to 50,000 amperes at 12 volts applied for $1/2$ second. Pressure was maintained for about 3 seconds and then released. The compact assembly was then moved to align the plungers with the adjacent overlaid compact portions and the same procedure was repeated. The procedure was again repeated until the eight compacts had been welded into an integral unit which was suitable for use as a consumable electrode in an arc melting furnace.

Since titanium, at welding temperature, has great affinity for oxygen, the welding operation was carried out in a closed, evacuated compartment.

The term "welding" is employed herein in its broadest sense in that the compacts are united by compression and heating of the projecting lands with the joining not necessarily involving complete melting of the land metal. Since the compacts are, as described, formed by compressing particulate metal, they are to an extent porous and also further compressible. The considerations involved are therefore quite different from those encountered in, for example, projection welding of solid metal pieces. In joining the compacts sufficient heat may be generated in the lands to completely melt the metal of which they are composed and this, on solidification, will produce a strongly welded joint. However, such temperatures are often undesirable, especially when working with reactive metals. In the process of this invention an amount of power may be used to heat the land metal to a plastic state or to a condition in which the individual particles will be strongly sintered together under influence of the pressure employed. The inherent compressibility of the compact structure, especially when heated and softened as in the vicinity of the lands, makes possible the absorption of the land metal in plastic or sintered state under the influence of the heat and pressure applied, to form a strong welded bond. Thus, an effective welding action may be obtained without complete fusing or melting of the lands which act as filler metal.

I claim:

1. A method for fabricating a consumable electrode from subdivided metal which comprises; compressing said subdivided metal into elongated compacts having the form of a semi-section of a fabricated electrode with lands projecting from the section faces thereof, assembling a plurality of said compacts in section face to section face relationship and staggered longitudinally so that a portion of the length of each compact overlays a portion of the length of a facing compact with lands on said compacts abutting land free areas on facing compacts, pressing the overlaid portions of facing compacts together to place the compact section faces substantially in contact and during such pressing passing sufficient electric current through said overlaid compact portions to form a weldment out of each land and to thereby weld said compacts into an integrated, fabricated consumable electrode structure.

2. A method for fabricating a consumable electrode from subdivided metal which comprises; compressing said subdivided metal into elongated compacts having the form of a semi-section of a fabricated electrode with elongated lands aligned with the longitudinal axes of said compacts projecting from the section faces thereof, assembling a plurality of said compacts in section face to section face relationship and staggered longitudinally so that a portion of the length of each compact overlays a portion of the length of a facing compact with lands on said compacts abutting land free areas on facing compacts, pressing the overlaid portions of facing compacts together and during such pressing passing sufficient electric current through said overlaid compact portions to form a weldment out of each land and to thereby weld said compacts into an integrated, fabricated consumable electrode structure.

3. A method for fabricating a consumable electrode from subdivided metal which comprises; compressing said subdivided metal into elongated compacts having the form of a semi-section of a fabricated electrode with lands projecting from the section faces thereof assembling a plurality of said compacts in section face to section face relationship and staggered longitudinally so that substantially one-half the length of each compact overlays substantially one-half the length of a facing compact with lands on said compacts abutting land free areas on facing compacts, pressing the overlaid portions of facing compacts together to place the compact section faces substantially in contact and during such pressing passing sufficient electric current through said overlaid compact portions to form a weldment out of each land and to thereby weld said compacts into an integrated, fabricated consumable electrode structure.

4. A method for fabricating a consumable electrode from subdivided metal which comprises; compressing said subdivided metal into elongated compacts having the form of a semi-section of a fabricated electrode with lands projecting from the section faces thereof, assembling a plurality of said compacts in section face to section face relationship and staggered longitudinally so that a portion of the length of each compact overlays a portion of the length of a facing compact with lands on said compacts abutting land free areas on facing compacts, pressing the overlaid portions of facing compacts together to place the compact section faces substantially in contact employing a pressure between 400 and 2,000 lbs. per square inch of land area between said overlaid compact portions and during such pressing passing between 8 and 300 kva. of electric current at between 4 and 22 volts through said overlaid compact portions to form a weldment out of each land and to thereby weld said compacts into an integrated, fabricated consumable electrode structure.

References Cited in the file of this patent

UNITED STATES PATENTS 2,086,985     Mitchell _____ July 13, 1937